United States Patent [19]

Kawahira

[11] Patent Number: 4,510,991

[45] Date of Patent: Apr. 16, 1985

[54] HEAT EXCHANGER AND FAN MOTOR IN A FRONT WHEEL DRIVE VEHICLE

[75] Inventor: Hiroto Kawahira, Shizuoka, Japan

[73] Assignee: Mitsubishi Denki Kabushiki Kaisha, Tokyo, Japan

[21] Appl. No.: 482,442

[22] Filed: Apr. 6, 1983

[30] Foreign Application Priority Data

May 31, 1982 [JP] Japan .................................. 57-92847

[51] Int. Cl.³ ............................................. F28F 3/02
[52] U.S. Cl. .......................................... 165/41; 62/243; 62/507; 165/122; 165/152; 165/153
[58] Field of Search .................. 62/507, 323.1, 243, 62/244, 239; 165/41, 152, 153, 122

[56] References Cited

U.S. PATENT DOCUMENTS

| | | | |
|---|---|---|---|
| 1,822,068 | 9/1931 | Summers | 165/152 |
| 1,823,858 | 9/1931 | Geiler | 62/507 |
| 2,195,259 | 3/1940 | Ramsaur | 165/152 |
| 2,261,579 | 11/1941 | Booth | 165/41 |
| 2,399,357 | 4/1946 | Koper | 165/175 |
| 2,461,409 | 2/1949 | Christensen | 165/151 |
| 2,820,617 | 1/1958 | Tadewald | 165/153 |
| 3,022,644 | 2/1962 | Grenier | 62/507 |
| 3,754,410 | 8/1973 | Jacobs | 62/507 |
| 4,138,857 | 2/1979 | Dankowski | |
| 4,296,805 | 10/1981 | Fleury | 165/151 |
| 4,330,030 | 5/1982 | Cate | 165/150 |
| 4,351,162 | 9/1982 | Yee | 62/244 |

FOREIGN PATENT DOCUMENTS 0572169 9/1945 United Kingdom ................ 165/152

Primary Examiner—Sheldon J. Richter
Assistant Examiner—Randolph A. Smith
Attorney, Agent, or Firm—Oblon, Fisher, Spivak, McClelland & Maier

[57] ABSTRACT

A heat exchange unit suitable for combination with a propeller fan comprises at least one pipe for coolant having porous passages for coolant inside thereof, said pipe being either spirally wound or one of a plurality of substantially circular pipes which are coaxially arranged. An inlet header are and an outlet header respectively connected to the inlet or the outlet of the pipe for coolant. At least one corrugated fin is interposed in a space formed between the adjacent pipes or portions of the spirally wound pipe. The heat exchanger is provided with a space at the central portion, and a fan motor is positioned in the central space of the heat exchanger. A propeller fan is fitted to the rotary shaft of the fan motor to feed air to the heat exchanger.

8 Claims, 17 Drawing Figures

HEAT EXCHANGER AND FAN MOTOR IN A FRONT WHEEL DRIVE VEHICLE

FIELD OF THE INVENTION

The present invention relates to a heat exchanging unit such as a condenser used for a device, e.g. an air conditioner for a vehicle, for the purpose of improving heat exchanging efficiency and reducing the weight of the unit.

DESCRIPTION OF THE PRIOR ART

FIG. 1 shows the typical construction of a heat exchanger (1) used in a condenser in an air conditioner for a vehicle. In such heat exchangers, a flat pipe (2) is bent into a continuous zig-zag form, the straight portions of the pipe being arranged parallel to each other with a constant gap therebetween, and corrugated fins (3) are disposed between the straight portions of the flat pipe (2).

In heat exchangers having the construction described above, a coolant is passed through the flat pipe (2), and air is fed to pass between the corrugated fins (3). Accordingly, heat-exchanging takes place between the air and the coolant. The coolant is passed from an inlet header (4) through the flat pipe (2) to an outlet header (5).

The shape of the heat exchanger (1) is generally rectangular. The heat exchanger is customarily mounted on a vehicle having rear-wheel drive at the front face portion of a radiator (7) as shown in FIG. 2 in such a manner that air is drawn through the corrugated fins (3) of the heat exchanger (1) by the revolution of a cooling fan (8) which is driven by the revolution of an engine (6) through a belt, thereby attaining heat-exchanging. However, in a vehicle having front-wheel drive the engine (6) is customarily mounted at substantially a right angle with respect to the moving direction of the vehicle (hereinafter, referred to as a horizontal engine), as shown in FIG. 3. In the case of the front-wheel driving type vehicle, the radiator cooling fan (8) is customarily driven by an electric motor which is placed at either side of the vehicle. In the case of the horizontal engine, an exhaust manifold (9) is generally provided at the front face portion of the vehicle. The heat exchanger (1), is mounted in front of the radiator (7), which is equipped with the motor-driven cooling fan (8). The cooling fan (8) is used in common for the radiator (7), and heat-exchanging is performed by passing air through the corrugated fins (3) of the condenser.

In the heat exchanger needed to equip the cooling fan (8), heat-exchanging is carried out when the vehicle is stopped and idling. As shown in FIGS. 4 and 5, an air flow (B) caused by the cooling fan passes only through the area of a circle (A), and portions (C) indicated by hatching of the heat exchanger (1) do not substantially contribute to heat-exchanging. Rather, as shown in FIG. 6, in the horizontal engine vehicle, the hatched portions (C) of the heat exchanger (1) tend to absorb heat due to the affect of heat radiation from the exhaust manifold (9). Thus, the conventional heat exchanger having a rectangular shape has a disadvantage in that it has a number of portions which do not contribute to heat-exchanging when the vehicle is idling.

OBJECTS OF THE INVENTION

It is an object of the present invention to arrange an electric fan motor in the central space of a heat exchanger, thereby rendering the thickness of the whole unit thin, making the unit integral, and minimizing non-uniformity of heat radiation due to the position of installation of the fan.

It is further object of the present invention to provide a heat exchanging unit in which the elements are combined in a coaxial manner about a space at the center of the unit. Such a unit preferably includes a plurality of substantially flat pipes provided with porous passages for coolant inside thereof; an inlet header connected to each inlet of the porous passages; an outlet header connected to each outlet of the porous passages; corrugated fins interposed between the flat pipes adjacent each other; and a fan motor fitted into the central space of the combined circular flat pipes, thereby obtaining a unitary construction of the heat exchanging unit, the cooling fan, and the cooling fan motor.

SUMMARY OF THE INVENTION

The foregoing and the other object of the present invention have been attained by providing a heat exchanger unit suitable for combination with a propeller fan comprising (a) at least one pipe for coolant having porous passages for coolant inside thereof, the pipe being spirally wound or composed of a plurality of substantially circular members which are coaxially arranged; (b) an inlet header connected to the inlet of the pipe; (c) an outlet header connected to the outlet of the pipe; and (d) at least one corrugated fin interposed in a space formed between adjacent pipes or portions of the pipe. In this construction, the heat exchanger is formed by the pipe for coolant, the inlet and outlet headers, and the corrugated fin. The heat exchanger is provided with a space at the central portion, and a fan motor is positioned in the central space of the heat exchanger. A propeller fan is fitted to the rotary shaft of the fan motor to feed air to the heat exchanger.

DETAILED DESCRIPTION OF THE PRESENTLY PREFERRED EMBODIMENTS

Figure 8:
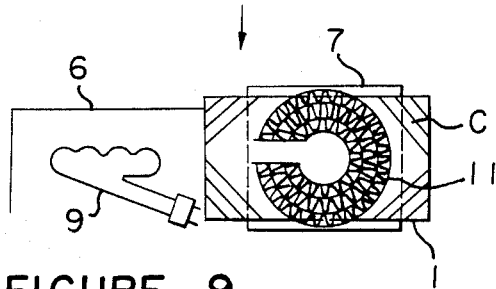
FIG. 8 is a diagram showing how the heat exchanger of the present invention is mounted on a horizontal engine type vehicle instead of the conventional rectangular heat exchanger.
Figure 9:
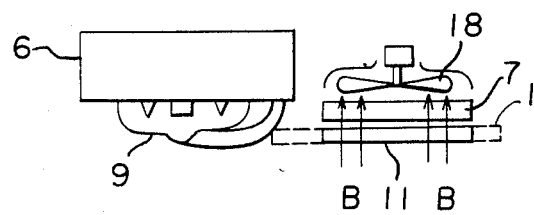
FIG. 9 is a plan view of FIG. 8.

A first embodiment of the present invention will be illustrated with reference to FIGS. 7 to 9, wherein the same reference numerals as in FIGS. 1 to 6 designate the same or corresponding parts.

In these figures, there are shown a plurality of concentrically arranged, substantially circular flat pipes (12), each flat pipe (12) being provided with porous passages for coolant inside thereof. The circular flat pipes (12) are combined in a coaxial manner with an equal distance therebetween. An inlet header (14) is positioned in communication with the porous passages for coolant in each of the circular flat pipes (12) that is, it is connected to the inlet of the respective circular flat pipes (12). An outlet header (15) is also connected to the outlets of the respective circular flat pipes (12). Corrugated fins (13) are interposed in the spaces between the flat pipes adjacent each other. Thus, a heat exchanger (11) having a plurality of circular paths is fabricated.

When the heat exchanger (11) is used as a condenser of an air conditioner for vehicles, it is so constructed that the height (diameter) is equal to or less than the height of the radiator (7). In this case, the condenser can be arranged in two steps at the front or rear of the radiator for the vehicle. Furthermore, the heat exchanger (11) has a space (16) suitable to receive the rotary shaft of a propeller fan at the central portion. The space (16) corresponds to a position where only small amount of air flows, thereby suffering from a poor heat radiation efficiency, when the propeller fan is rotated. Accordingly, an increase in the overall heat radiation efficiency and reduction in the total weight may be achieved by non-installation of the heat exchanger at that position. Thus, in the heat exchanger (11) of the present invention, a heat exchanging part can be effectively positioned in the air-flowing portion (B) produced by the cooling fan (18) for the radiator (7). The cooling fan (18) may be driven by transmitting the revolution of the engine through a belt. Alternatively, a motor-driven cooling fan (18) may be used for the horizontal engine. It should be particularly noted that it is easy to avoid the influence of heat radiation from the exhaust manifold (9) of the horizontal engine. It is also easy to fabricate a circular heat exchanger (11) which provides a heat exchanging area the same as that of the conventional rectangular heat exchanger (1) in which the hatched portions (C) (which are incapable of heat exchanging) are removed and the capacity of the conventional rectangular heat exchanger is attained. Namely, removal of unnecessary or counter productive parts of the heat exchanging area, which has not been attained in the conventional rectangular heat exchanger, can be realized by the circular heat exchanger of the present invention. Thus, the circular heat exchanger of the present invention provides the advantages of increasing heat exchanging efficiency and reducing the weight.

Figure 1:
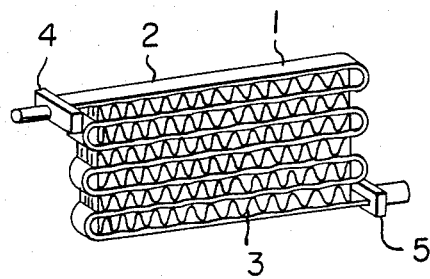
FIG. 1 is a schematic view of a conventional heat exchanger.
Figure 2:
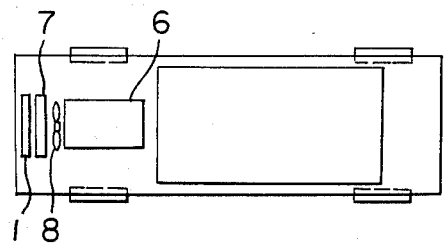
FIG. 2 is a diagram showing the customary arrangement of the heat exchanger in a rear wheel drive vehicle.
Figure 3:
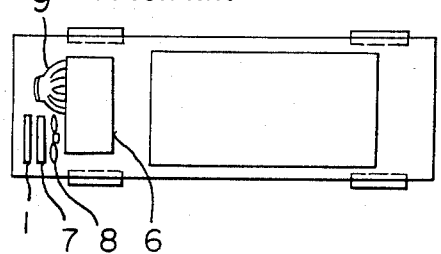
FIG. 3 is a diagram showing the customary arrangement of the heat exchanger in a horizontal engine type vehicle.
Figure 4:
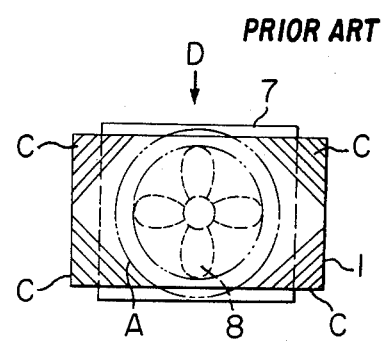
FIG. 4 is a front view of a conventional heat exchanger mounted on a vehicle.
Figure 5:
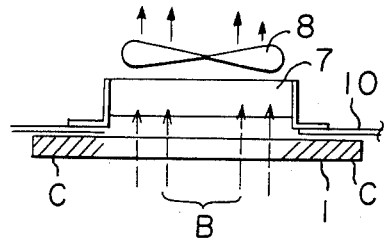
FIG. 5 is a plan view of the heat exchanger shown in FIG. 4.
Figure 6:
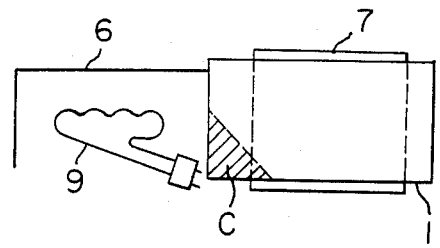
FIG. 6 is a diagram showing how a conventional heat exchanger is mounted on a horizontal engine type vehicle.
Figure 7:
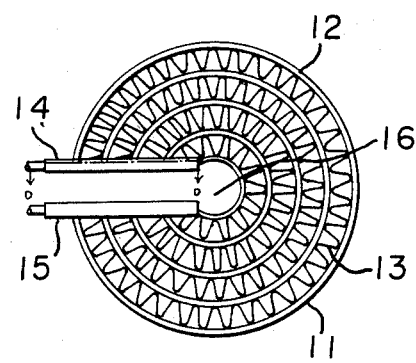
FIG. 7 is a front view of an embodiment of the heat exchanger of the present invention.
Figure 10:
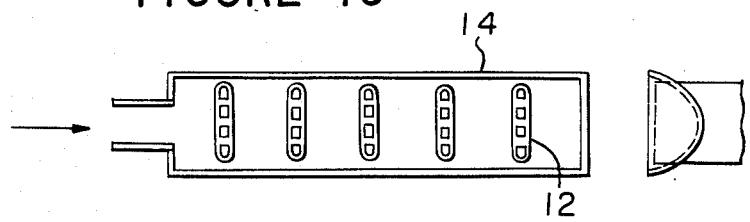
FIG. 10 is a cross sectional view taken along the line D—D in FIG. 7.

FIG. 10 is a cross sectional view taken along the line D—D in FIG. 7 in which the interiors of the flat pipes (12) are shown. The inlet ends, of the flat pipes (12) are firmly welded to the inlet header (14). The coolant is fed into all the porous passages located in each flat pipe (12).

A second embodiment of the present invention will be illustrated with reference to FIGS. 11 to 14. As previously noted, the present invention is characterized by the combination of the heat exchanger described above and a fan motor. Illustration will now be made of an embodiment in which a heat exchanger in a spiral form is used.

Figure 11:
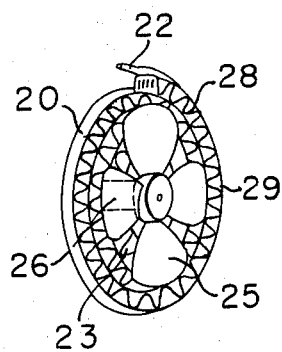
FIG. 11 is a schematic view of another embodiment of the heat exchanging unit of the present invention.

As shown in FIG. 11, a heat exchanger (29) is fabricated from a spirally wound flat pipe (20) provided with porous passages for coolant. An inlet header (22) is connected to the inlet portion of the flat pipe (20); an outlet header (23) is connected to the outlet portion of the flat pipe (20) a corrugated fin (28) is interposed between adjacent portions of the flat pipe (20). The overall configuration is a doughnut-like shape. A fan motor (26) is fitted into the central portion of the doughnut-like configuration, and a propeller fan (25) is secured to the motor shaft. In this case, the revolving direction of the fan is determined depending on the position where the radiator (7) for the vehicle is located.

Figure 12A:
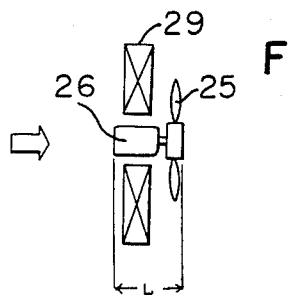
FIGS. 12A and 12B are respectively schematic views in cross section of the heat exchanging unit of the present invention and the conventional device.
Figure 12B:
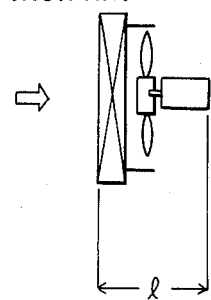

As shown in FIG. 12A, in the combination of the heat exchanger (29) and the fan (25), the dimension (L) needed for provision of a heat exchanging unit can be smaller than the comparable dimension (l) for the conventional unit shown in FIG. 12B because the motor (26) is received in the central space of the heat exchanger (29). Accordingly, limitations on the place and angle for installing the unit are eliminated or minimized.

Figure 13:
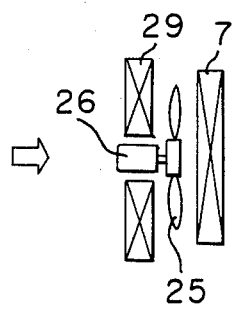
FIG. 13 is a schematic view of the heat exchanging unit of the present invention including a radiator.

Furthermore, as shown in FIG. 13, limitations on the place for installing the unit can be eliminated or minimized even in the case of the combination of the unit with the radiator (7) of a vehicle.

Figure 14A:
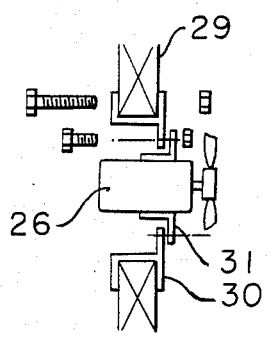
FIGS. 14 A, B and C are respectively schematic views of the heat exchanging unit shown in FIG. 11 in combination with a fan casing.
Figure 14B:
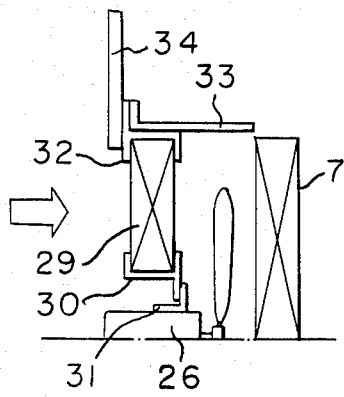
Figure 14C:
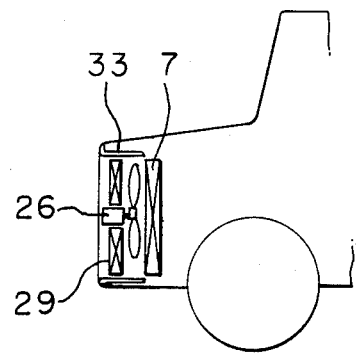

Illustrations of the arrangement of the heat exchanger (29) and the fan motor (26) as well as air flow passing through these devices including a fan casing will be made in more detail with reference to FIG. 14. In FIG. 14A, the fan motor (26) is secured to the heat exchanger (29) as follows: a stay (30) for the heat exchanger is fastened to the inner side of the heat exchanger (29) by means of bolts and nuts; a stay (31) is welded to the casing of the fan motor (26); and the stay (31) is fastened to the inner flange of the stay (30) by means of bolts and nuts. In FIG. 14B, a stay (32) secured to the outer side near the body (34) and to a vehicle of the heat exchanger (29) by means of bolts and nuts is fastened to a fan casing (33). With this structure, revolution of the propeller fan feeds air from the front of the vehicle through the heat exchanger (29) to the radiator (7). FIG. 14C schematically illustrates the front part of the vehicle.

In this embodiment, a sectional view of the flat pipe (20) would be similar to the flat pipe (12) shown in FIG. 10.

As described above, in accordance with the present invention, the thickness of a heat exchanging unit in combination of the heat exchanger (29), the fan (25), and the fan motor (26) is remarkably small in comparison with the conventional unit as shown in FIG. 12B. This provides flexibility in selecting the position where the heat exchanging unit is to be installed. Furthermore, the heat exchanging unit of the present invention provides a great advantage concerning the distribution of heat radiation from the heat exchanger. Namely, a part of the heat exchanger which is poor in performing heat exchanging because of the central front portion of the propeller fan and which is weak in air flow, is reformed to a doughnut-like configuration whereby a balanced heat radiation and a good heat exchanging efficiency can be obtained.

I claim:

1. A front-wheel drive motor vehicle comprising:
   (a) a horizontal engine, said horizontal engine being mounted at at least substantially a right angle with respect to the moving direction of said motor vehicle;
   (b) an exhaust manifold operatively associated with said horizontal engine;
   (c) a radiator located adjacent to said horizontal engine and to said exhaust manifold, said radiator being located to one side of said horizontal engine with respect to the moving direction of said motor vehicle; and
   (d) a heat exchanger unit located adjacent to said radiator but spaced therefrom in the moving direction of said motor vehicle, said heat exchanger unit comprising:
      (i) a plurality of flat pipes in at least substantially circular form provided with passages for coolant inside thereof, said flat pipes being concentrically arranged, being radially spaced from one another, and having an axial central space within the innermost one of said plurality of flat pipes;
      (ii) an inlet header connected to the inlets of each of said plurality of flat pipes;
      (iii) an outlet header connected to the outlets of each of said plurality of flat pipes;
      (iv) corrugated heat exchanger fins interposed in at least some of the spaces between said plurality of flat pipes, said heat exchanger fins being in thermal contact with adjacent ones of said plurality of flat pipes and being at least generally coplanar with said plurality of flat pipes;
      (v) a fan motor positioned in said axial central space, said fan motor having a rotory shaft which extends axially outwardly of said plurality of flat pipes and said corrugated heat exchanger fins; and
      (vi) a propeller fan mounted on said rotory shaft and sized and position to draw cooling air between said radially spaced flat pipes and over said corrugated heat exchanger fins.

2. A front-wheel drive motor vehicle as recited in claim 1 wherein said propeller fan is positioned between said plurality of flat pipes and said radiator.

3. A front-wheel drive motor vehicle as recited in claim 1 wherein said heat exchanger unit is located in front of said radiator with respect to the moving direction of said motor vehicle.

4. A front-wheel drive motor vehicle as recited in claim 1 wherein said heat exchanger unit is located behind said radiator with respect to the moving direction of said motor vehicle.

5. A front-wheel drive motor vehicle comprising:
   (a) a horizontal engine, said horizontal engine being mounted at least substantially a right angle with respect to the moving direction of said motor vehicle;
   (b) an exhaust manifold operatively associated with said horizontal engine;
   (c) a radiator located adjacent to said horizontal engine and to said exhaust manifold, said radiator being located to one side of said horizontal engine with respect to the moving direction of said motor vehicle; and
   (d) a heat exchanger unit located adjacent to said radiator but spaced therefrom in the moving direction of said motor vehicle, said heat exchanger unit comprising:
      (i) a spirally wound flat pipe provided with passages for coolant inside thereof, adjacent portions of said spirally wound flat pipe being spaced from one another, said spirally wound flat pipe having an axial central space within the innermost portion of said spirally wound flat pipe;
      (ii) an inlet header connected to the inlet of said spirally wound flat pipe;
      (iii) an outlet header connected to the outlet of said spirally wound flat pipe;
      (iv) corrugated heat exchanger fins interposed between adjacent portions of said spirally wound flat pipe, said heat exchanger fins being in thermal contact with adjacent portions of said spirally wound flat pipe and being at least generally coplanar with said spirally wound flat pipes;
      (v) a fan motor positioned in said axial central space, said fan motor having a rotory shaft which extends axially outwardly of said spirally wound flat pipe and said corrugated heat exchanger fins; and
      (vi) a propeller fan mounted on said rotory shaft and sized and positioned to draw cooling air between adjacent portions of said spirally wound flat pipe and over said corrugated heat exchanger fins.

6. A front-wheel drive motor vehicle as recited in claim 5 wherein said propeller fan is positioned between said spirally wound flat pipe and said radiator.

7. A front-wheel drive motor vehicle as recited in claim 5 wherein said heat exchanger unit is located in front of said radiator with respect to the moving direction of said motor vehicle.

8. A front-wheel drive motor vehicle as recited in claim 5 wherein said heat exchanger unit is located behind said radiator with respect to the moving direction of said motor vehicle.

* * * * *